United States Patent Office 3,238,201
Patented Mar. 1, 1966

3,238,201
ISATOIC ANHYDRIDE DERIVATIVES
Robert Allan Scherrer, Ann Arbor, Mich., assignor to Parke, Davis & Company, Detroit, Mich., a corporation of Michigan
No Drawing. Filed Aug. 23, 1963, Ser. No. 304,258
6 Claims. (Cl. 260—244)

This application is a continuation-in-part of application Serial No. 223,520, filed September 18, 1962, and now abandoned.

This invention relates to N-arylisatoic anhydrides of the formula

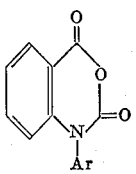

and to methods for their production; where Ar represents (a) 3-trifluoromethylphenyl or (b) a substituted phenyl radical of the formula

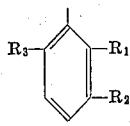

where $R_1$ represents methyl or chloro, $R_2$ represents lower alkyl, lower alkoxy, or chloro, and $R_3$ represents hydrogen, methyl, or chloro. The lower alkyl and lower alkoxy groups are those containing fewer than 4 carbon atoms are preferably methyl and methoxy.

According to the invention, N-arylisatoic anhydrides of the foregoing formula are produced by reacting an N-arylisatin of the formula

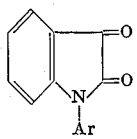

with an oxidizing agent; where Ar is as defined before. The oxidizing agent selected is one capable of introducing an oxygen atom between the adjacent carbonyl groups without substantial decomposition of the ring. Some examples of such suitable oxidizing agents are organic peroxy acids such as peracetic, perbenzoic, monoperphthalic, permaleic, and peroxytrifluoroacetic acid as well as other peroxy compounds such as hydrogen peroxide and persulfuric acid. A preferred oxidizing agent is peracetic acid. At least the theoretical amount and preferably an excess of the oxidizing agent is used. For best results, the oxidization reaction is carried out under acidic or approximately neutral conditions and a preferred solvent is a lower alkanoic acid such as acetic acid or propionic acid. Other solvents such as benzene can also be used. The reaction is normally carried out at a temperature of 0–100° C. Where the oxidizing agent is peracetic acid or a similar peroxy acid, there is no need to heat the reaction mixture and the oxidization is substantially complete at room temperature within 24 hours.

The N-arylisatins required as starting materials can be prepared by a variety of methods. For example, a 2-chloro-4-methylquinoline is reacted with a phenol of the formula Ar—OH in the presence of sodium hydride, where Ar is as defined before, to give a 2-aryloxy-4-methylquinoline. The latter compound is heated to cause migration of the aryl group with the formation of an N-aryl-4-methylcarbostyril which is oxidized with potassium permanganate in basic medium and the product acidified to give an N-arylisatin. Some of the N-arylisatins can also be prepared by reacting an appropriately substituted diphenylamine with oxalyl chloride to produce an N-aryl-N-phenyloxamic acid chloride which is converted to an N-arylisatin by reaction with aluminum chloride in carbon disulfide followed by hydrolysis.

Also in accordance with the invention N-arylisatoic anhydrides of the foregoing formula are produced by reacting an N-arylanthranilic acid of the formula

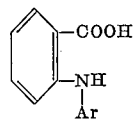

with a tertiary amine and an alkyl chloroformate; where Ar is as defined before. The reaction is carried out by heating the N-arylanthranilic acid with the calculated amount or up to a moderate excess of a tertiary amine and at least the calculated amount but preferably a considerably excess of an alkyl chloroformate. A preferred tertiary amine is triethylamine and a preferred alkyl chloroformate is ethyl chloroformate. As a solvent, either an excess of the alkyl chloroformate or an inert solvent such as benzene, toluene, or xylene can be used. The reaction is normally carried out by heating the reactants at 50–100° C., or at the reflux temperature of the mixture, for from 2 to 24 hours. In some cases, an improved yield is obtained by allowing the reaction mixture to stand at room temperature for 24 hours before the heating period. In carrying out this process, an intermediate product, a mixed anhydride of the formula

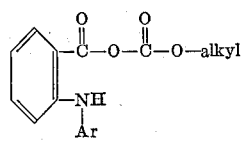

where Ar is as defined before, is first formed; this mixed anhydride undergoes further transformation to the N-arylisatoic anhydride.

The N-arylanthranilic acid required as starting materials can be prepared by a variety of methods. For example, the potassium salt of o-bromobenzoic acid is heated in a solvent with an amine of the formula Ar—NH$_2$ in the presence of a base and a copper-containing catalyst, and the reaction product is acidified to produce the N-arylanthranilic acid; where Ar is as defined before.

Further in accordance with the invention, N-arylisatoic anhydrides of the foregoing formula are produced by ring closure of an N-arylisatoic acid N-alkyl ester of the formula

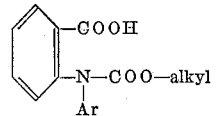

with elimination of an alkanol; where Ar is as defined before. The ring closure can be carried out by any of a variety of procedures, for example, by heating the N-arylisatoic acid N-alkyl ester with or without a solvent, or by reacting it with an acid halide, either an organic acid halide such as acetyl chloride or an inorganic acid halide such as thionyl chloride or phosphorus tribromide. When the ring closure is carried out by heating, the starting material is heated either with or without a solvent at about 100–250° C. for 10 minutes to 48 hours, the shorter reaction times being used at the higher temperatures. Some examples of suitable solvents are toluene, xylene, mesitylene, dichlorobenzene and dimethylacetamide. When the ring closure is carried out with an acid halide, the starting material is treated with approximately one equivalent or an excess of the acid halide and maintained at about 10–100° C. for from 1–48 hours, the shorter reaction times being used at the higher temperatures. As solvent, an excess of the acid halide or an inert diluent such as ether or benzene can be used.

The N-arylisatoic acid N-alkyl esters required as starting materials can be prepared by a variety of methods. For example, a mixed anhydride of the formula

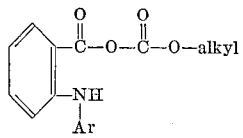

where Ar is as defined before, is allowed to stand at room temperature for 2–6 weeks during which time it undergoes rearrangement to the N-arylisatoic acid N-alkyl ester; this rearrangement can be accelerated by a very brief period of heating.

Still further in accordance with the invention, N-arylisatoic anhydrides of the foregoing formula are produced by reacting an N-(o-carboxyphenyl)-N-aryloxamic acid of the formula

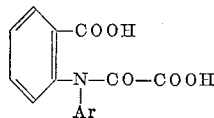

with an oxidizing agent; where Ar is as defined before. The oxidizing agent selected is one capable of causing formation of the anhydride without substantial decomposition. A preferred oxidizing agent is potassium permanganate. At least the theoretical amount, and preferably a small excess, of the oxidizing agent is used. The reaction can be carried out in solution or suspension in unreactive media such as water, dioxane, tetrahydrofuran, or mixtures thereof. The reaction is normally carried out at a temperature of 0–100° C., preferably 25–30° C. at which temperature the reaction is substantially complete in less than an hour.

The N-(o-carboxyphenyl)-N-aryloxamic acids required as starting materials can be prepared by a variety of methods. For example, 2-chloroquinoline is reacted with a phenol of the formula

Ar—OH in the presence of sodium hydride, where Ar is as defined before, to give a 2-aryloxyquinoline. The latter compound is heated to cause migration of the aryl group with the formation of an N-arylcarbostyril which is oxidized with potassium permanganate in pyridine and the product acidified to give an N-(o-carboxyphenyl)-N-aryloxamic acid. Alternatively, the starting materials can be produced by reaction of an N-arylanthranilic acid with oxalyl chloride followed by hydrolysis.

The N-arylisatoic anhydrides of the invention are of value as pharmacological agents and as chemical intermediates. They are anti-inflammatory agents, useful in relieving the pain and mitigating the symptoms of inflammatory conditions as well as in preventing or suppressing the occurrence of inflammation. They are effective on either oral or parenteral administration. A limited number of the compounds of the invention such as N-(2,3-dimethylphenyl)isatoic anhydride also exhibit analgesic activity. As a chemical intermediate, the latter compound is converted to N-(2,3-dimethylphenyl)-anthranilic acid and its salts by hydrolysis, for example by heating it under reflux for one hour with a 10% solution of sodium hydroxide in aqueous ethanol.

The invention is illustrated by the following examples.

*Example 1*

A solution of 5 g. N-(2,3-dimethylphenyl)-isatin in 185 ml. acetic acid containing 35 ml. 40% peracetic acid (in acetic acid) is held for 5 hours at 25° C. The solution is diluted with 600 ml. water and the insoluble N-(2,3-dimethylphenyl)isatoic anhydride is collected on a filter; M.P. 197–198° C. following crystallization from ethanol.

The starting material is prepared as follows. 18 grams of 2,3-dimethylphenol is added in portions to a cooled, stirred suspension of 6.9 g. of 54% sodium hydride in 75 ml. of diethylene glycol dimethyl ether. The mixture is warmed at 50° C. until evolution of hydrogen ceases and then 25 g. of 2-chloro-4-methylquinoline is added in one portion. The mixture is heated under reflux for 2 hours, allowed to stand at room temperature overnight, diluted with ice and water and extracted with ether. The ether extract is washed with several portions of water, dried and evaporated to give 2-(2,3-dimethylphenoxy)-4-methylquinoline, M.P. 123–124° C. following crystallization from aqueous ethanol. 47.8 g. of this product is heated under nitrogen at 320–330° C. for 3 hours and the melt is partially cooled, diluted with 300 ml. of cyclohexane, and stirred at reflux. The insoluble N-(2,3-dimethylphenyl)-4-methylcarbostyril is collected; M.P. 194–195° C. following crystallization from aqueous ethanol. Two grams of this product is dissolved in 25 ml. of pyridine with warming and the solution is diluted with 10 ml. of 2 N sodium hydroxide and then with 15 ml. of water. Over a two-hour period 5.6 g. of potassium permanganate is added while the temperature is maintained with cooling at 35–40° C. The mixture is slowly cooled to room temperature and after 18 hours it is made slightly more basic and filtered. The filtrate is washed twice with ether, strongly acidified with hydrochloric acid and allowed to stand overnight. The N-(2,3-dimethylphenyl)isatin is collected; M.P. 188° C. following crystallization from ethanol.

*Example 2*

A suspension of 0.2 g. N-(2,3-dichlorophenyl)-isatin in 10 ml. benzene containing 0.27 g. 85% m-chloroperbenzoic acid is stirred at 25° C. for 30 minutes. The resulting solution is washed with 10% sodium bicarbonate solution and with water, dried, and concentrated to give a residue of N-(2,3-dichlorophenyl)-isatoic anhydride; M.P. 194–195° C. following crystallizations from benzene.

The starting material is prepared as follows. Over a period of 3 hours, 28.0 g. of 2,3-dichlorodiphenylamine is added to a refluxing solution of 20 ml. of oxalyl chloride in 75 ml. ethylene chloride. Heating is continued for 2 hours and the reaction mixture then concentrated under reduced pressure. Petroleum ether is added and removed in vacuo twice to remove the last traces of oxalyl chloride and leave a residue of N-2,3-dichlorophenyl)-N-phenyloxamic acid chloride, M.P. 89–93° C. A solution of 29.5 g. of this product in 190 ml. carbon disulfide is treated with 49.6 g. of powdered aluminum chloride over a 15-minute period. The mixture is heated at reflux for 1¼ hours, concentrated at reduced pressure, hydrolyzed with ice and water, and extracted with ethylene chloride. The extract is washed, dried and evaporated to give a residue of N-(2,3-dichlorophenyl)isatin; M.P. 197–198° C. following crystallization from aqueous ethanol and from benzene.

*Example 3*

A mixture of 0.25 g. N-(2,3-dichlorophenyl)-isatin in 6 ml. acetic acid containing 1.5 ml. 40% peracetic acid is stirred for 24 hours at 25° C. The mixture is diluted with water and the insoluble product is collected on a filter. It is N-(2,3-dichlorophenyl)-isatoic anhydride; M.P. 194–195° C. following crystallizations from benzene.

*Example 4*

A mixture of 0.25 g. N-(2,3-dichlorophenyl)-isatin in 6 ml. acetic acid containing 1.5 ml. 40% peracetic acid and 0.25 ml. 70% perchloric acid is heated for 2 hours at 40–65° C. and then cooled. The mixture is diluted with water and the insoluble N-(2,3-dichlorophenyl) isatoic anhydride is collected on a filter; M.P. 194–195° C. following crystallizations from benzene.

*Example 5*

A solution of 12.5 g. N-(2,6-dimethyl-3-ethylphenyl) isatin in 400 ml. benzene containing 18.4 g. 85% m-chloroperbenzoic acid is stirred at 25° C. for 16 hours. The reaction mixture is washed with sodium bicarbonate solution and with water, dried, and evaporated to give a residue of N-(2,6-dimethyl-3-ethylphenyl)isatoic anhydride. For purification, it is crystallized from benzene-cyclohexane.

The starting material is prepared as follows. Over a period of 15 minutes, 160 g. aluminum chloride is added to a solution of 60.0 g. 2,6-dimethylacetanilide and 57.8 g. acetyl chloride in 125 ml. carbon disulfide. The mixture is stirred at room temperature until hydrogen chloride evolution has almost ceased and is then warmed briefly to complete the reaction. The carbon disulfide is removed by decantation and the residue decomposed by the cautious addition of ice. The insoluble product is stirred with water and collected on a filter; it is 3-acetamido-2,4-dimethylacetophenone, M.P. 132–133.5° C. following crystallization from benzene. A mixture of 20 g. of this product in 150 ml. acetic acid containing 2 g. 20% palladium on carbon catalyst is shaken under hydrogen at a pressure of 3 atmospheres until the calculated amount of hydrogen is absorbed. The catalyst is removed by filtration and the filtrate is distilled under reduced pressure to give a residue of 2,6-dimethyl-3-ethyl-acetanilide; M.P. 176–178° C. following crystallization from ethanol. A mixture of 14.7 g. of this product, 45 ml. sulfuric acid and 45 ml. water is heated at reflux for 30 hours, cooled, and poured onto ice. Insoluble starting material is removed by filtration and the filtrate is made basic with 50% sodium hydroxide and extracted with ether. The ether extract is separated, washed with water, and evaporated to give a residue of 2,6-dimethyl-3-ethylaniline as an oil. A mixture of 25.8 g. potassium o-bromobenzoate, 10.8 g. 2,6-dimethyl-3-ethylaniline, 9.05 ml. N-ethylmorpholine, 2.0 g. cupric bromide and 35 ml. dimethylformamide is heated in a nitrogen atmosphere at 110–117° C. for 2 hours. The mixture is acidified with 6 N hydrochloric acid and diluted with water. The insoluble N-2,6-dimethyl-3-ethylphenyl)anthranilic acid is collected on a filter and redissolved in dilute sodium hydroxide solution. The solution is filtered, washed with ether, and acidified to reprecipitate the product; M.P. 209° C. following crystallizations from aqueous ethanol. A solution of 25.0 g. N-(2,6-dimethyl-3-ethylphenyl)-anthranilic acid in 90 ml. quinoline is heated at reflux with 2 g. copper powder for 2 hours. The mixture is cooled, acidified with 6 N hydrochloric acid and extracted with ether. The ether extract is washed with dilute sodium hydroxide and with water, dried, and evaporated to give a residue of 2,6-dimethyl-3-ethyldiphenylamine. A solution of 18.0 g. of this product in 50 ml. ethylene chloride is added over a period of 2 hours to a refluxing solution of 22.0 g. oxalyl chloride in 50 ml. ethylene chloride. Heating at reflux is continued for 2 more hours and the mixture is then distilled to dryness under reduced pressure. Remaining traces of oxalyl chloride are removed by distillation with added quantities of benzene. The residue of N-(2,6-dimethyl-3-ethylphenyl)-N-phenyloxamic acid chloride is dissolved in 100 ml. carbon disulfide and 26.0 g. powdered aluminum chloride is added in portions. The mixture is heated at reflux for one hour, distilled under reduced pressure to remove carbon disulfide and stirred with ethylene chloride, ice, and water. The organic phase is separated, washed, dried, and evaporated to give a residue of N-(2,6-dimethyl-3-ethylphenyl)isatin, suitable for use without further purification.

*Example 6*

A suspension of 9.9 g. N-(2,6-dichloro-3-methylphenyl) isatin in 81 ml. acetic acid containing 56.4 ml. 40% peracetic acid is stirred at 25° C. for 10 hours. The mixture is diluted with water and the insoluble N-(2,6-dichloro-3-methylphenyl)isatoic anhydride is collected on a filter; M.P. 174.5–176° C. following crystallizations from ethanol.

The starting material is obtained as follows. A solution of 60.0 g. N-(2,6-dichloro-3-methylphenyl)-anthranilic acid in 197 ml. quinoline containing 5.8 g. copper powder is heated at reflux for 1½ hours, or until evolution of carbon dioxide is complete. The mixture is cooled, stirred with 295 ml. 6 N hydrochloric acid and extracted with ether. The extract is washed with dilute sodium hydroxide solution and with water, dried and concentrated to give a residue of 2,6-dichloro-3-methyldiphenylamine. A sample of this product crystallized from aqueous methanol had M.P. 76–78° C. A solution of 46.8 g. 2,6-dichloro-3-methyldiphenylamine in 175 ml. ethylene chloride is added over a period of 3½ hours to a refluxing solution of 47.2 g. oxalyl chloride in 118 ml. ethylene chloride. Heating is continued for another 2 hours and the solvent and excess oxalyl chloride removed in vacuo. Benzene is added and the solution reconcentrated three times to remove the remaining oxalyl chloride and leave a residue of N-(2,6-dichloro-3-methylphenyl)-N-phenyloxamic acid chloride. A solution of 60.5 g. of this product in 280 ml. carbon disulfide is treated with 74.5 g. anhydrous powdered aluminum chloride added over a period of 15 minutes. After the initial exothermic reaction, the mixture is heated at reflux for 1¼ hours, concentrated under reduced pressure, diluted with ethylene chloride and hydrolyzed with ice and water. The organic phase is separated and evaporated to give a residue of N-(2,6-dichloro-3-methylphenyl)isatin; M.P. 169.5–171.5° C. following crystallizations from benzene-cyclohexane and from benzene.

*Example 7*

A solution of 5.1 g. N-(2,6-dichloro-3-methoxyphenyl)isatin and 6.3 g. 85% m-chloroperbenzoic acid in 175 ml. benzene is stirred at 25° C. for 48 hours. The mixture is diluted with benzene, washed with sodium bicarbonate solution and with water, dried and evaporated to give a residue of N-(2,6-dichloro-3-methoxyphenyl)isatoic anhydride; M.P. 202–203° C. following several crystallizations from benzene.

The starting material is prepared as follows. A mixture of 49.1 g. 2,4-dichloro-3-nitrophenol, 98.0 g. anhydrous potassium carbonate and 98 ml. dimethyl sulfate in 500 ml. xylene is stirred and heated at reflux for 2 hours. It is then cooled and stirred with ether and water. The organic phase is separated, washed with 0.5 N sodium hydroxide, with water, and with sodium chloride solution, dried, and evaporated to give a residue of 2,4-dichloro-3-nitroanisole; M.P. 95–97° C. after crystallization from aqueous ethanol. A solution of 19.8 g. of this product and 400 ml. methanol containing 1 g. Raney nickel catalyst is shaken with hydrogen at a pressure of 15–30 pounds per square inch and a temperature of 25–40° C. until the theoretical amount of hydrogen is absorbed. The mixture is filtered and evaporated to give a residue of 2,6-dichloro-3-methoxyaniline, suitable for use without further purification. A mixture of 22.7 g. cupric o-bromobenzoate, 19.2 g. 2,6-dichloro-3-methoxyaniline and 12.25 ml. N-ethylmorpholine in 50 ml. dimethylformamide is heated in a nitrogen atmosphere at 125–145° C. for 2½ hours. The mixture is cooled, acidified with concentrated hydrochloric acid and diluted with water. The insoluble product, N - (2,6-dichloro-3-methoxyphenyl)anthranilic acid, is dissolved in 2 N sodium hydroxide solution. The solution is filtered and washed with ether and then acidified with hydrochloric acid to reprecipitate the product. A more highly purified product is obtained by crystallization from aqueous ethanol; M.P. 259–261° C. Ten grams N-(2,6-dichloro-3-methoxyphenyl)anthranilic acid is heated at reflux in 32 ml. quinoline with 0.9 g. copper powder for 1¾ hours. The mixture is cooled, acidified with 6 N hydrochloric acid and extracted with ether. The ether is washed with dilute sodium hydroxide solution and with water, dried and concentrated to give a residue of 2,6-dichloro-3-methoxydiphenylamine; M.P. 88–90° C. following crystallization from aqueous methanol. A mixture of 4.2 g. 2,6-dichloro-3-methoxy-diphenylamine, 4.0 g. oxalyl chloride and 25 ml. ethylene chloride is heated at reflux for 1½ hours and concentrated under reduced pressure. Several portions of benzene are added to the residue and removed by vacuum distillation to cause complete removal of excess oxalyl chloride. The residue of N-(2,6-dichloro-3-methoxyphenyl)-N-phenyloxamic acid chloride is dissolved in 25 ml. carbon disulfide and treated with 6.6 g. anhydrous powdered aluminum chloride. The mixture is heated at reflux for 4 hours, concentrated in vacuo, diluted with ethylene chloride and hydrolyzed with ice and water. The insoluble product is triturated with aqueous ethanol to give crude N-(2,6-dichloro-3-hydroxyphenyl)-isatin. For remethylation, a solution of this product in 15 ml. dimethylacetamide is treated with 0.76 g. 50% sodium hydride and 4.5 g. methyl iodide. The mixture is heated at 60° C. for 1¾ hours, diluted with water, acidified, and extracted with ether. The ether extract is washed, dried, and evaporated to give N-(2,6-dichloro-3-methoxyphenyl)isatin, suitable for use without further purification.

*Example 8*

With stirring, 10.5 g. triethylamine is slowly added to a suspension of 25.0 g. N-(2,3-dimethylphenyl)anthranilic acid in 100 ml. ethyl chloroformate. The mixture is stirred at 25° C. for 24 hours, heated at reflux for 4 hours, diluted with benzene and filtered. The benzene solution is evaporated to dryness to give a residue of N-(2,3-dimethylphenyl)isatoic anhydride; M.P. 197–198.5° C. following crystallizations from ethanol.

*Example 9*

With stirring, 10.5 g. triethylamine is slowly added to a suspension of 25.0 g. N-(3-trifluoromethylphenyl)anthranilic acid in 100 ml. ethyl chloroformate. The mixture is stirred at 25° C. for 16 hours, heated at reflux for 11 hours, diluted with benzene, washed with water, dried and concentrated. The residue is stirred with cyclohexane and the insoluble fraction, N-(3-trifluoromethylphenyl)isatoic anhydride, is collected on a filter; M.P. 172–173.5° C. following crystallization from benzene.

*Example 10*

One gram N-(2,3-dimethylphenyl)isatoic acid N-ethyl ester is heated in an open reaction vessel for one hour at 170° C. The resulting N-(2,3-dimethylphenyl)isatoic anhydride is purified by several crystallizations from ethanol; M.P. 197–198° C.

The starting material is obtained as follows. With stirring and external cooling at 0–10° C., 10.5 g. triethylamine is added to a suspension of 25 g. N-(2,3-dimethylphenyl)anthranilic acid in 100 ml. ethyl chloroformate. The mixture is kept at room temperature for 16 hours and then diluted with ether, washed with water, dried, and evaporated to give a residue of an oily mixed anhydride. This anhydride is allowed to stand at room temperature for 2 weeks and then heated for 10 minutes at 100° C. The solid product obtained is N-(2,3-dimethylphenyl)isatoic acid N-ethyl ester; M.P. 147.5–149° C. following crystallization from benzene-cyclohexane.

*Example 11*

A mixture of 1 g. N-(2,3-dimethylphenyl)-isatoic acid N-ethyl ester and 5 ml. xylene is heated at 140° C. for 2 hours, with partial condensation of the distillate to permit removal of the ethanol formed in the reaction. The mixture is cooled and the insoluble N-(2,3-dimethylphenyl)isatoic anhydride is collected; M.P. 198–199° C.

*Example 12*

A mixture of 2.0 g. N-(2,3-dimethylphenyl)-isatoic acid N-ethyl ester, 25 ml. benzene, and 0.92 g. thionyl chloride is heated at 80° C. for 3 hours and cooled to room temperature. The insoluble N-(2,3-dimethylphenyl)isatoic anhydride is collected on a filter; M.P. 197–198° C. following crystallization from ethanol. The same product is obtained by reacting N-(2,3-dimethylphenyl)isatoic acid N-ethyl ester with phosphorus tribromide in ether solution for 24 hours at 25° C.

*Example 13*

A solution of 0.17 g. of potassium permanganate in 10 ml. of water is added to a suspension of 0.50 g. of N-(o-carboxyphenyl)-N - (2,3 - dimethylphenyl)oxamic acid in 50 ml. of water at 28° C. The mixture is stirred at 28° C. for one hour or until the permanganate color disappears. The mixture is filtered and the solid collected on the filter is washed with several portions of methylene chloride. The methylene chloride washings are added to the aqueous filtrate and the combined methylene chloride-water solutions are concentrated to a small volume under reduced pressure at 10–15° C. The insoluble N-(2,3-dimethylphenyl)isatoic anhydride which separates is collected on a filter; M.P. 197–198° C. following crystallization from ethanol.

The starting material is prepared as follows. A suspension of sodium 2,3-dimethylphenolate is prepared by the gradual addition of 32 g. of 2,3-dimethylphenol to a suspension of 12.6 g. of 54% sodium hydride (dispersed in mineral oil) in 400 ml. of 1:1 dimethylformamide-ethylene glycol dimethyl ether. The mixture is maintained at about 25° C. during the addition and then it is warmed to 50° C., 40.9 g. of 2-chloroquinoline is added, and the mixture is heated under reflux for 11 hours. It is cooled, diluted with ice and water, and extracted twice with ether. The ether extract is washed with cold 0.5 N sodium hydroxide, 4 times with water, and with sodium chloride solution. It is then dried and evaporated to give 2-(2,3-dimethylphenoxy)-quinoline; M.P. 72–73° C. following crystallizations from heptane and from aqueous methanol. A mixture of 23.7 g. of this product in 25 ml. of heavy mineral oil is heated under nitrogen at 325 to 330° C. for 4 hours. (The reaction can also be carried out by similarly heating a melt of the starting material.) The product is extracted with 600 ml. of boiling cyclohexane and recovered by concentrating the solution and removing the product by filtration. It is N-(2,3-dimethylphenyl)carbostyril, M.P. 167–168° C. after crystallization from aqueous ethanol. A solution of 2.5 g. of this product in 35 ml. of pyridine is diluted with 40 ml. of water, cooled in an ice bath and then treated with 5.9 g. of potassium permanganate added in 4 portions over a period of 40 minutes between 0–20° C. The mixture is then maintained at 3° C. for 18 hours and stirred for 2 more hours at room temperature. The excess potassium permanganate is decolorized with methanol. The mixture is diluted with water and 2 N sodium hydroxide, a filter aid is added, and the mixture is filtered. The filtrate is washed with ether and the aqueous phase is acidified. A small amount of gummy solid which first separates is discarded, and the principal product which separates upon further standing as a white, granular solid is collected. It is N - (o-carboxyphenyl) - N-(2,3-dimethylphenyl)oxamic acid, suitable for use without further purification.

The starting material can also be prepared as follows. With stirring over a 3-hour period, 24.0 g. N-(2,3-dimethylphenyl)anthranilic acid is added to a solution of 50.8 g. oxalyl chloride in 240 ml. benzene. The mixture is allowed to stand 2½ days at room temperature and is then filtered. The filtrate is washed with water and then extracted with dilute sodium hydroxide solution. The alkaline solution is separated, acidified, and extracted with ether. The ether extract is washed, dried, and evaporated to give a residue of N-(o-carboxyphenyl)-N-(2,3-dimethylphenyl)oxamic acid; M.P. 168–176° C. following trituration with benzene.

I claim:
1. N-arylisatoic anhydrides of the formula

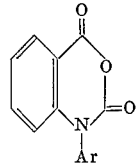

where Ar is a member of the class consisting of
(a) 3-trifluoromethylphenyl, and
(b) substituted phenyl radicals of the formula

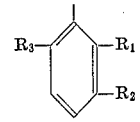

where $R_1$ is a member of the class consisting of methyl and chloro, $R_2$ is a member of the class consisting of lower alkyl, lower alkoxy and chloro, and $R_3$ is a member of the class consisting of hydrogen, methyl, and chloro.
2. N-(2,3-dimethylphenyl)isatoic anhydride.
3. N-(3-trifluoromethylphenyl)isatoic anhydride.
4. N-(2,3-dichlorophenyl)isatoic anhydride.
5. N-(2,6-dichloro-3-methylphenyl)isatoic anhydride.
6. N-(2,6-dichloro-3-methoxyphenyl)isatoic anhydride.

No references cited.

WALTER A. MODANCE, *Primary Examiner.*
ROBERT T. BOND, *Examiner.*